United States Patent [19]
Jones

[11] 3,869,693
[45] Mar. 4, 1975

[54] SCANNING ARRANGEMENT FOR SONAR BEAMS

[75] Inventor: Charles H. Jones, Murrysville, Pa.

[73] Assignee: The United States of America as represented by the Secretary of the Navy, Washington, D.C.

[22] Filed: Nov. 22, 1967

[21] Appl. No.: 686,379

[52] U.S. Cl. .......................... 340/6 R, 343/100 SA
[51] Int. Cl. ............................................. G01s 3/80
[58] Field of Search ............... 340/6, 16, 6 R, 16 R; 343/100 SA

[56] References Cited
UNITED STATES PATENTS 3,295,138  12/1966  Nelson ........................... 343/100 X
3,356,989  12/1967  Autrey ................................. 340/6

*Primary Examiner*—Richard A. Farley
*Attorney, Agent, or Firm*—R. S. Sciascia; L. I. Shrago

[57] ABSTRACT

In the beam scanning arrangement disclosed, each transducer of a vertical linear array of transducers is associated with a delay line subdivided into a plurality of sections. Each first section is progressively longer as one proceeds down the transducer array, while all of the other sections are progressively shorter. There are three short sections which may be switched in and out of each delay line in a combination of conditions to bring about scanning of the various beams formed by extracting the signals along a corresponding number of points along the progressively shorter portions of the delay lines.

8 Claims, 4 Drawing Figures

INVENTOR.
Charles H. Jones

INVENTOR.
Charles H. Jones

SCANNING ARRANGEMENT FOR SONAR BEAMS

The invention described herein may be manufactured and used by or for the Government of the United States of America for governmental purposes without the payment of any royalties thereon or therefor.

The present invention relates generally to apparatus for and methods of scanning a multiplicity of directional beams and, more particularly, to an arrangement for achieving simultaneous movement of a multiplicity of beams by discrete amounts which requires a minimum number of delay lines and associated switching mechanisms.

In one proposed sonar ranging system, the signal detecting apparatus consists of a single, vertical string of thirty equally spaced transducers. The signals received by these transducers are amplified and fed to a network of delay lines where information concerning eight specific arrival angles is derived. The outputs of these delay lines are added, fed to detectors, and a recording is made of signal intensity versus elevation angle. From this plot, range information can be derived.

The present invention accomplishes the above mode of operation with far fewer connections and components than prior art systems. More particularly, each transducer is associated with a delay line having five segments, eight output taps and three mechanical or electronic switches associated with each delay line provide the desired scanning of the beams.

It is accordingly a primary object of the present invention to provide a new and improved method for accomplishing scanning of a multiplicity of beams which requires a minimum number of components, connections and cooperating switching mechanisms.

Another object of the present invention is to provide a beam scanning arrangement for a vertical array of transducers which permits all beams to be switched simultaneously to each of a number of given positions.

Another object of the present invention is to provide an arrangement for accomplishing beam scanning wherein a simple binary counter may be used to control the beam indexing.

Other objects, advantages and novel features of the invention will become apparent from the following detailed description of the invention when considered in conjunction with the accompanying drawings wherein.

Figure 1:
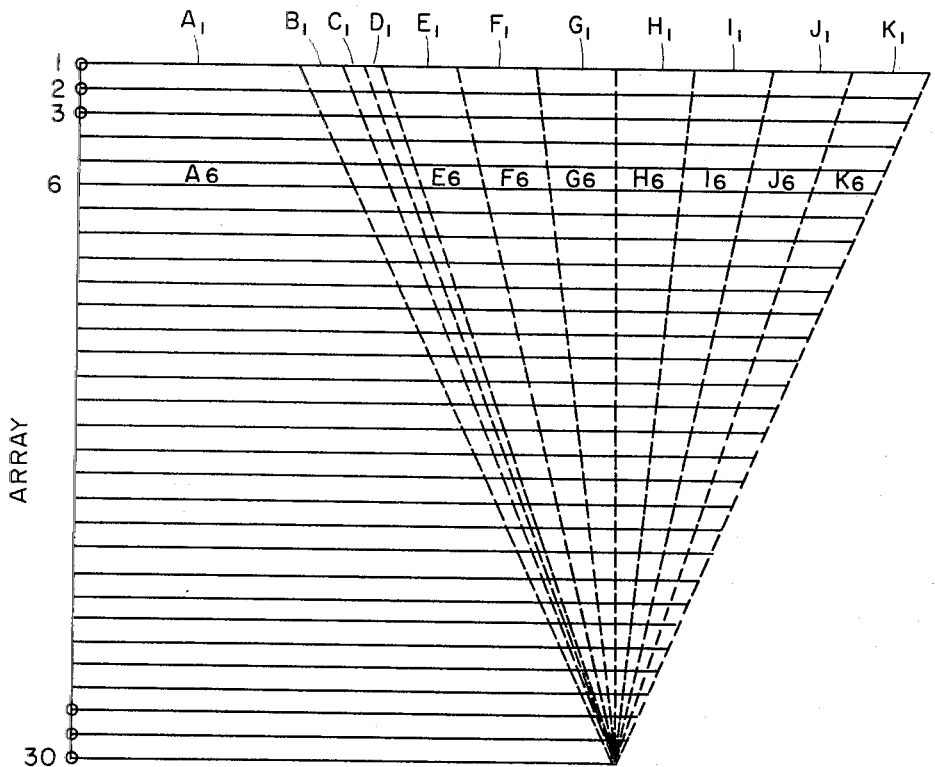
FIG. 1 is a schematic illustration helpful to an understanding of the mode of operation of one embodiment of the present invention.

The manner in which the present invention accomplishes the simultaneous scanning of, for example, eight beams may best be understood by referring now to FIG. 1 of the drawings. As shown in this illustration, the receiving apparatus of the sonar system consists of thirty equally spaced transducers, 1 to 30, arranged in a vertical line. Each transducer is associated with a horizontal line whose length represents signal delay time. For example, transducer 1, the uppermost element of the array, is connected to the longest horizontal line while transducer 30, the lowest transducer of the array, is connected to the shortest horizontal line. Each of the individual delay lines has eleven sections, A, B, C . . . K. The first section, A, of each line is of a progressively longer time delay as one proceeds down the line from transducer 1 to transducer 30 of the array. The other sections making up each delay line are all progressively shorter.

Figure 2:
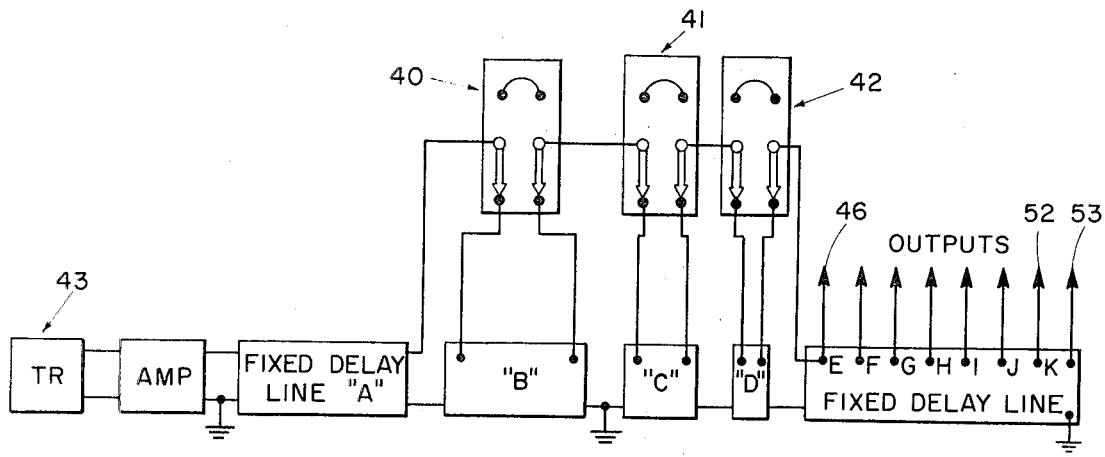
FIG. 2 shows a control system for one of the transducers of the array.

Sections E, F, G, H, I, J and K of each delay line are of equal length. Also, each delay line contains three relatively short delay sections, B, C and D, and these sections, as seen in FIG. 2, are associated with switching apparatus 40, 41 and 42 for permitting their insertion or removal from the delay line. Section D is one-eighth, section C two-eighths, and section B four-eighths the length of one of the seven equal sections, E for example; and the same relationship holds true throughout the whole system, that is, sections $D_6$, $C_6$, $B_6$ associated with transducer 6 are also one-eighth, two eighths and four-eighths the length of one of the seven equal sections, $E_6$ and so forth.

To form the lowest beam, which in the illustration shown is at approximately an −30° angle, all of the signals at the start of the E sections are extracted through suitable decoupling resistors and combined to form a single output. This output is detected and fed to a recorder. To form the next lowest beam, the signals are extracted after they have passed further down the delay line and reached the start of each F section. In the same way, signals associated with the six other beams are obtained at the start of sections G, H, I, J, K and, also, at the end of the K sections.

To accomplish the scanning of these eight beams, the control system makes use of the three sections, B, C and D. As shown in FIG. 2, switches 40, 41 and 42, which are double-poled, double-throw types, determine whether or not these sections are in or out of the delay path. By throwing these switches to their lower positions as shown in FIG. 2, each of the above three sections becomes part of the delay system. Normally, that is, at the beginning of a particular scanning cycle, these switches are all in their upper positions and sections B, C and D are bypassed. Thus, for example, the signal originating at a typical transducer 43 and fed into one end of its delay line proceeds through section A, then through switches 40, 41 and 42, thereby avoiding sections B, C, D, and thereafter through the remaining sections E, F . . . K to the end of the line, and being extracted at the eight points 46, 47, 48 . . . 53 to form the various beams. Likewise, all the other signals from the transducers pass down their delay lines in the same manner, that is, avoiding sections B, C, and D and passing through all the other sections. In this condition, all the beams are in their lowest position.

Scanning is accomplished by first moving switch 42 and all other switches associated with the individual D sections to their lower positions while maintaining switches 41 and 40 in their upper positions. The amount of delay thus introduced into all of the delay lines moves all eight beams up one step or about 1°. After a predetermined time, dependent upon the scanning rate desired, switch 42 is returned to its upper position and switch 41 moved to its lower position. This causes all beams to shift upwardly one more step or degree. Thereafter, to move all beams up a third step, switch 41 is left at its lower position and switch 42 moved back to its lower position. Now, all delay lines have sections C and D effective. The next upward step is achieved by restoring switches 42 and 41 to their upper positions and for the first time moving switch 40 to its lower position. Now all delay lines have B sections effective and C and D sections ineffective, and all beams are now in their next higher position. Next, switch 42 is moved to its lower position and, with switch 40 still in its lower position, the beams move up another step. Thereafter, switch 42 is moved to its upper position, switch 41 moved to its lower position and switch 40 held at its lower position. And, finally, in the highest beam positions all three switches, as shown in FIG. 2, are in their lower positions and all of the sections B, C, D are incorporated into their signal delay systems. The highest beam positions, consequently, correspond to the use of all of the delay elements B, C and D.

Figure 3:
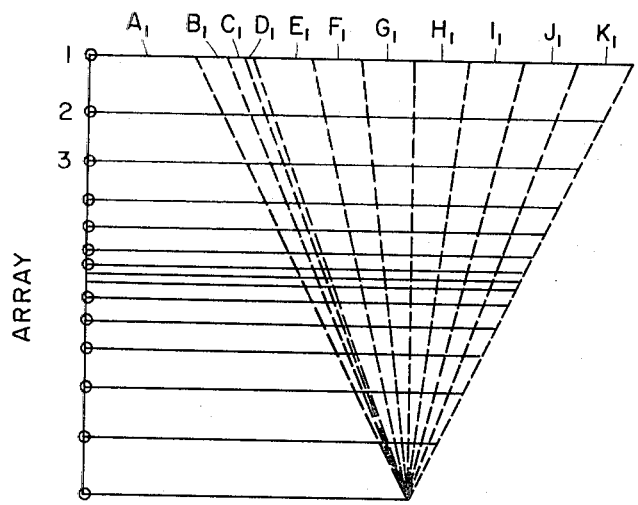
FIG. 3 is a schematic illustration similar to that of FIG. 1, showing an alternative arrangement of transducers.

The above method of beam scanning is also applicable to a linear array of nonuniformly spaced transducers. It is not restricted to uniformly spaced elements. In arrays which are designed to work over a number of octaves or decades in frequency, it is often desirable to locate the transducers in a linear array wherein their spacing is closer at the center of the array. FIG. 3 graphically shows the relative lengths of the delay lines associated with an array of this type. The separation of delay lines, it will be appreciated, in this illustration is proportional to the separation of the individual transducers making up this array.

Figure 4:
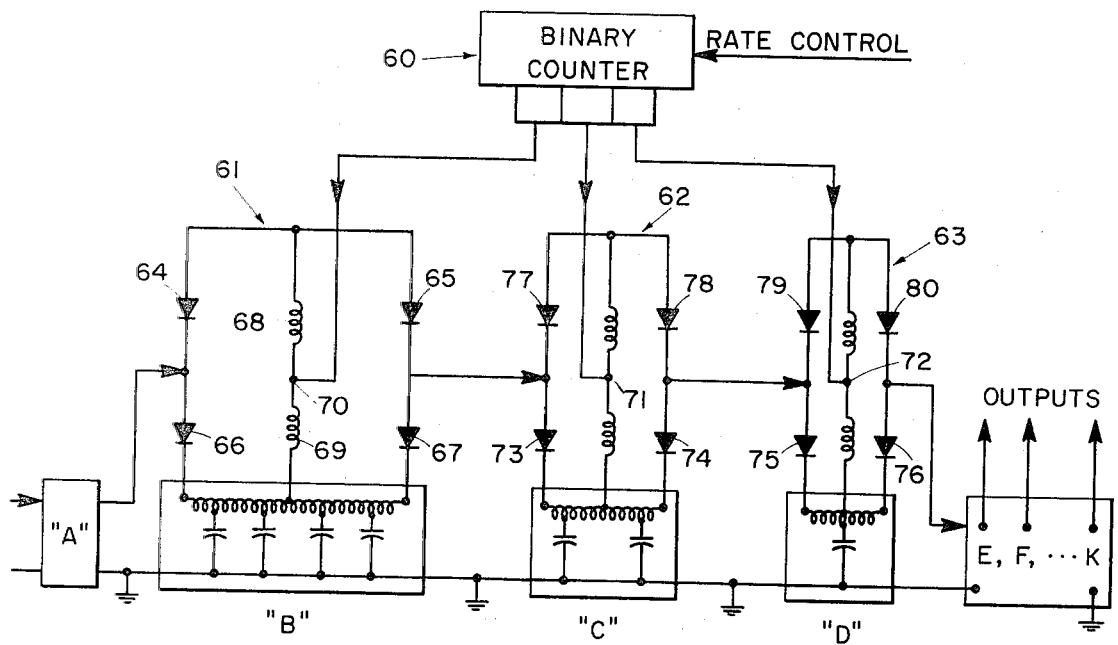
FIG. 4 shows an alternative control system for achieving scanning of the array.

The function of the three mechanical switches 40, 41 and 42 in FIG. 2 may be performed electronically by means of a circuit such as the one shown in FIG. 4. Here, the eight permutations of switching combinations obtainable with the above three switches is duplicated by controlling three equivalent switching circuits 61, 62 and 63 from a binary counter 60 stepped by a suitable source of control pulses.

In order to switch section B, for example, into the delay system, binary counter 60 provides a negative signal from its third stage to point 70 of circuit 61, and positive signals from its first and second stages to points 71 and 72 of circuits 62 and 63. The negative signal applied to point 70 causes diodes 66 and 67 to conduct and diodes 64 and 65 to be cut off. Likewise, the positive signals applied to points 71 and 72 cause diodes 77, 78 and 79, 80 to have a low impedance and diodes, 73, 74 and 75, 76 to have a high impedance. Thus, section B is introduced into the delay system and sections C and D bypassed. The coils, such as 68, 69, present a high impedance to the sonar frequencies and a low impedance to the switching signals. Consequently, they do not interfere with the transmission of the sonar signals through the delay circuits.

The scanning of the beams in the system of FIG. 4 is similar to that previously described in connection with the system of FIG. 2. That is, as the count registered in binary counter 60 advances, positive and negative signals from the different stages of the counter control the switching of the three sections B, C and D to progressively move all of the beams upwardly by 1° increments. For example, with a zero count registered in counter 60, positive signals are applied to points 70, 71 and 72; diodes 64, 65, 77, 78, 79 and 80 have low impedance; and all of the delay segments B, C and D are bypassed. When the count advances to 1, a negative signal is sent only to point 72; diodes 75 and 76 are rendered conducting; and section D, alone, is introduced into the delay circuit. The beams, therefore, move up a first step. When the count increases to 2, the negative pulse is applied only at point 71, and section C, alone, is introduced into the delay circuit. And as the count further increases, both sections C and D are thereafter introduced into the circuit, and so forth.

The following table shows the correlation between the binary signal registered in the counter, the polarity of the switching signals applied to points 70, 71, 72 and the approximate angles that each beam makes with the horizontal.

Beam Positions for Each Binary Signal

| Binary Signal | Polarity of Three Signals 70 | 71 | 72 | Approximate Angle that Each Beam Makes with the Horizontal | | | | | | | |
|---|---|---|---|---|---|---|---|---|---|---|---|
| 0 0 0 | + | + | + | −31° | −23° | −15° | −7° | 1° | 9° | 17° | 25° |
| 0 0 0 | + | + | − | −30° | −22° | −14° | −6° | 2° | 10° | 18° | 26° |
| 0 1 0 | + | − | + | −29 | −21 | −13 | −5 | 3 | 11 | 19 | 27 |
| 0 1 1 | + | − | − | −28 | −20 | −12 | −4 | 4 | 12 | 20 | 28 |
| 1 0 0 | − | + | + | −27 | −19 | −11 | −3 | 5 | 13 | 21 | 29 |
| 1 0 1 | − | + | − | −26 | −18 | −10 | −2 | 6 | 14 | 22 | 30 |
| 1 1 0 | − | − | + | −25 | −17 | −9 | −1 | 7 | 15 | 23 | 31 |
| 1 1 1 | − | − | − | −24° | −16° | −8° | 0° | 8° | 16° | 24° | 32° |

The length of time the beams occupy any one position, of course, may be regulated by controlling the pulse train serving as the input to the binary counter. It will also be appreciated that the condition of the beams at any given time may be ascertained by examining the count then registered in the counter. Also, the manner in which the beams scan may be controlled by selecting the type of counter used in the system. Thus, with a reversible unit, the beams may be made to sweep up and down. With the usual counter, the beams will only move upwardly, as described.

Obviously many modifications and variations of the present invention are possible in the light of the above teachings. It is therefore to be understood that within the scope of the appended claims the invention may be practiced otherwise than as specifically described.

What is claimed is:

1. In an underwater sound detecting system of the type wherein $m$ vertically spaced, directional beams are scanned to detect wave fronts arriving at a receiving site at different arrival angles, the combination of
   a multiplicity of equally spaced transducers, said transducers being arranged in a vertical line at said receiving site;
   a similar multiplicity of delay lines, one end of each delay line being connected to a corresponding transducer whereby the signals produced by said transducers are sent down different delay lines,
   said delay lines being of progressively shorter length with the delay line having the longest length being connected to the transducer at the top of said vertical line;

means for extracting said signals at various points along said delay lines so as to impart to said transducers a beam pattern which includes $m$ equally spaced, vertical beams with said signals corresponding to the acoustic signals picked up by said m-beams; and means for switching portions of each delay line into and out of its delay lines thereby to shift said directional beams by incremental amounts.

2. In an arrangement as defined in claim 1 wherein a binary counter controls said switching operation and the effective length of the portions switched into said delay line may be represented by a binary count.

3. In an arrangement as defined in claim 1 wherein the delay line portions switched into and out of the delay lines change the effective length of the delay lines by linear amounts corresponding to increasing binary counts.

4. In an underwater sound detecting system of the type wherein $m$ vertically spaced, directional beams are scanned to detect wave fronts arriving at a receiving site at different arrival angles, the combination of a multiplicity of transducers, said transducers being arranged in a vertical line at said receiving site;

a similar multiplicity of delay lines, one end of each delay line being connected to a corresponding transducer whereby the signal produced by each transducer is sent down a different delay line, said delay lines being of progressively shorter length, with the longest delay line being connected to the transducer at the top of said vertical line, each delay line including a first section which is at that end of the line that is connected to a transducer, each first section being of progressively longer length with the shortest first section being in that delay line which is connected to the transducer at the top of said vertical line, the remaining portion of each delay line being divided into $m$ equal subsections with the subsection next to each first section being further subdivided into a multiplicity of fractional lengths;

means for extracting the signals at the end of each of the equal length subsections thereby to obtain $m$ output signals; and means for switching said fractional length sections into and out of their delay lines thereby to shift said vertically spaced, directional beams by finite amounts.

5. In an arrangement as defined in claim 4 wherein said fractional length sections are one-eighths, two-eighths and four-eighths the length of each of said equal length sections.

6. In an arrangement as defined in claim 5 wherein the four-eighth fractional length is adjacent said first section;

said two-eighth fractional length is adjacent said four-eighth length; and said one-eighth fractional length is adjacent said two-eighth length.

7. In an arrangement as defined in claim 4 wherein said means for switching said fractional lengths into and out of their delay lines includes a multiplicity of switching means, the number of switching means corresponding to the number of fractional lengths in each delay line.

8. In an arrangement as defined in claim 4 wherein a three-stage binary counter controls the open or closed condition of said switching means.

* * * * *